(12) United States Patent
Cabillic et al.

(10) Patent No.: US 7,757,223 B2
(45) Date of Patent: Jul. 13, 2010

(54) METHOD AND SYSTEM TO CONSTRUCT A DATA-FLOW ANALYZER FOR A BYTECODE VERIFIER

(75) Inventors: Gilbert Cabillic, Brece (FR); Jean-Philippe Lesot, Etrelles (FR); Mikael Peltier, Bourg-des-Comptes (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1323 days.

(21) Appl. No.: 11/188,502

(22) Filed: Jul. 25, 2005

(65) Prior Publication Data

US 2006/0026404 A1 Feb. 2, 2006

(30) Foreign Application Priority Data

Jul. 27, 2004 (EP) .................................. 04291918

(51) Int. Cl.
*G06F 9/45* (2006.01)
*G06F 9/44* (2006.01)
(52) U.S. Cl. .................... 717/155; 717/156; 717/158
(58) Field of Classification Search .............. 717/134, 717/136, 137, 154–160
See application file for complete search history.

(56) References Cited

U.S. PATENT DOCUMENTS

| | | | |
|---|---|---|---|
| 5,442,790 A * | 8/1995 | Nosenchuck | 717/155 |
| 5,507,030 A * | 4/1996 | Sites | 717/136 |
| 5,542,075 A * | 7/1996 | Ebcioglu et al. | 717/151 |
| 5,638,525 A | 6/1997 | Hammond et al. | |
| 5,649,203 A * | 7/1997 | Sites | 717/156 |
| 5,740,461 A | 4/1998 | Jaggar | |
| 5,761,515 A * | 6/1998 | Barton et al. | 717/158 |
| 5,781,750 A | 7/1998 | Blomgren et al. | |
| 5,875,336 A | 2/1999 | Dickol et al. | |
| 5,889,999 A | 3/1999 | Breternitz et al. | |
| 5,983,337 A | 11/1999 | Mahalingaiah et al. | |
| 6,021,484 A | 2/2000 | Park | |
| 6,026,485 A * | 2/2000 | O'Connor et al. | 712/226 |
| 6,035,122 A * | 3/2000 | Ando | 717/155 |

(Continued)

OTHER PUBLICATIONS

Hampton et al, "Implementing virtual memory in a vector processor with software restart markers", ACM ICS, pp. 135-144, 2006.*

(Continued)

*Primary Examiner*—Anil Khatri
(74) *Attorney, Agent, or Firm*—Ronald O. Neerings; Wade James Brady, III; Frederick J. Telecky, Jr.

(57) ABSTRACT

The problems noted above are solved in large part by a method and system to construct a data-flow analyzer for a bytecode verifier using existing hardware resources and software. Specifically, micro-sequences and JSM hardware resources may be employed fetch a first instruction, apply the first instruction to a decode logic of a processor, trigger execution of a first series of instructions by the decode logic that pops a first value off of a data structure, such as a stack or local variable map, the first value indicative of a parameter type pushed on the stack or local variable map by a previously decoded instruction; and verify that the first value is a parameter type expected by the first instruction.

22 Claims, 3 Drawing Sheets

U.S. PATENT DOCUMENTS

| | | | |
|---|---|---|---|
| 6,035,123 A * | 3/2000 | Razdan et al. | 717/155 |
| 6,233,733 B1 | 5/2001 | Ghosh | |
| 6,260,157 B1 | 7/2001 | Schurecht et al. | |
| 6,298,434 B1 | 10/2001 | Lindwer | |
| 6,412,109 B1 | 6/2002 | Ghosh | |
| 6,480,952 B2 | 11/2002 | Gorishek et al. | |
| 6,507,947 B1 * | 1/2003 | Schreiber et al. | 717/160 |
| 6,691,308 B1 | 2/2004 | Kasper | |
| 6,704,860 B1 | 3/2004 | Moore | |
| 6,941,545 B1 * | 9/2005 | Reese et al. | 717/130 |
| 6,954,923 B1 * | 10/2005 | Yates et al. | 717/130 |
| 7,013,456 B1 * | 3/2006 | Van Dyke et al. | 717/130 |
| 7,047,394 B1 * | 5/2006 | Van Dyke et al. | 712/209 |
| 7,062,762 B2 * | 6/2006 | Krishnamurthy et al. | 717/156 |
| 7,111,290 B1 * | 9/2006 | Yates et al. | 717/158 |
| 7,137,110 B1 * | 11/2006 | Reese et al. | 717/158 |
| 7,155,708 B2 * | 12/2006 | Hammes et al. | 717/155 |
| 7,254,806 B1 * | 8/2007 | Yates et al. | 717/136 |
| 7,401,328 B2 * | 7/2008 | Lu | 717/159 |
| 7,624,382 B2 | 11/2009 | Chauvel et al. | |
| 2002/0188825 A1 | 12/2002 | Seal et al. | |
| 2003/0126408 A1 | 7/2003 | Vajapeyam et al. | |
| 2005/0060696 A1 | 3/2005 | Bicsak et al. | |

OTHER PUBLICATIONS

Psarakis et al, "Syatematic software based self test for pipelined processors", ACM DAC, pp. 393-398, 2006.*

Krashinsky et al, "The vector thread architecture", IEEE ISCA, pp. 1-12, 2004.*

Clark et al, "Processor acceleration through automated instruction set customization", IEEE MICRO, pp. 1-12, 2003.*

Meixner et al, "Error detection using dynamic dataflow verification", IEEE, pp. 104-115, 2007.*

Lee et al, "Instruction set synthesis with efficient instruction encoding for configurable processors", ACM Trans. on Design Automation of Electronic Systems, vol. 12, No. 1, article 8, pp. 1-37, 2007.*

Don Lance et al., "Bytecode-based Java Program Analysis," ACM Southeast Regional Conference, Proceedings of the 37th Annual Southeast Regional Conference (CD-ROM), Article No. 14, pp. 1-7, 1999.

Michael Chen and Kunle Olukotun, "Targeting Dynamic Compilation for Embedded Environments," Proceedings of the 2nd Java Virtual Machine Research and Technology Symposium, pp. 151-164, Aug. 1-2, 2002.

Jang-Wu Jo and Byeong-Mo Chang, "Constructing Control Flow Graph that Accounts For Exception Induced Control Flows for Java," Proceedings of the 7th Korea-Russia International Symposium, vol. 2, pp. 160-165, Jun. 28-Jul. 6, 2003.

Keith D. Cooper et al., "Building a Control Flow Graph from Scheduled Assembly Code," Technical Report TR02-399, Rice University, pp. 1-9, Jun. 2002, available at http://citeseerx.ist.psu.edu/viewdoc/summary? doi=10.1.1.13.8801.

* cited by examiner

| R0 | GENERAL PURPOSE (GP) | |
|---|---|---|
| R1 | GENERAL PURPOSE (GP) | |
| R2 | GENERAL PURPOSE (GP) | |
| R3 | GENERAL PURPOSE (GP) | |
| R4 | PROGRAM COUNTER (PC) | |
| R5 | GENERAL PURPOSE/LOCAL VARIABLE POINTER (LV) | |
| R6 | STACK POINTER (SP) | |
| R7 | TOP OF STACK (ToS) | |
| R8 | GENERAL PURPOSE/ADDRESS INDEX 0 (AI0) | |
| R9 | GENERAL PURPOSE/ADDRESS INDEX 1 (AI1) | |
| R10 | GENERAL PURPOSE (GP) | |
| R11 | GENERAL PURPOSE (GP) | |
| R12 | MICRO-PROGRAM COUNTER (micro-PC) | |
| R13 | GENERAL PURPOSE (GP) | |
| R14 | GENERAL PURPOSE/INDIRECT REGISTER INDEX (IRI) | |
| R15 | STATUS AND CONTROL (ST) | MICRO-SEQUENCE ACTIVE BIT ~198 |

*FIG. 3*

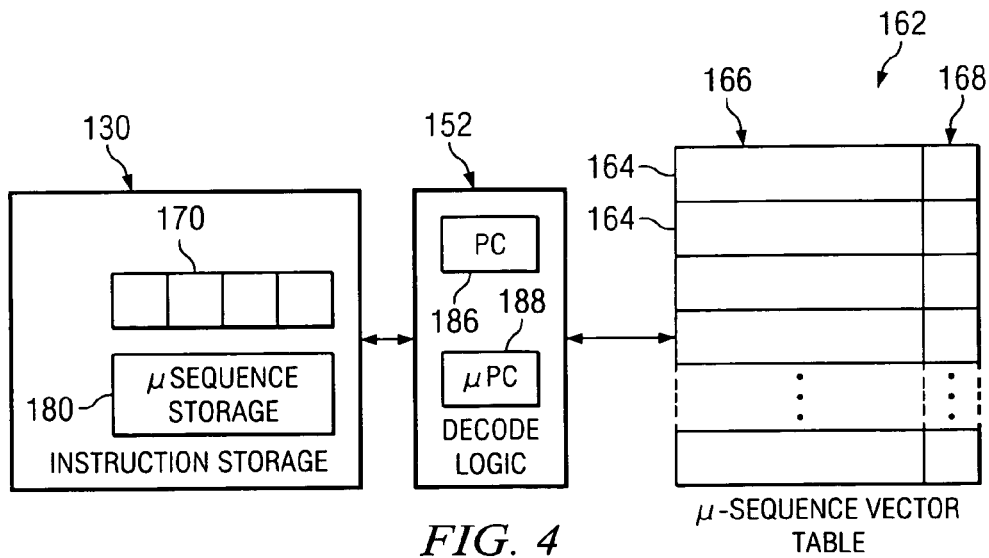

*FIG. 4*

METHOD AND SYSTEM TO CONSTRUCT A DATA-FLOW ANALYZER FOR A BYTECODE VERIFIER

CROSS-REFERENCE TO RELATED APPLICATIONS

This application claims priority to EPO Patent Application No. 04291918.3, filed on Jul. 27, 2004, incorporated herein by reference.

BACKGROUND OF THE INVENTION

1. Technical Field of the Invention

Various embodiments of the present disclosure relate to processors and, more particularly, to a method and system to construct a data-flow analyzer for a bytecode verifier through integrated hardware resources and software.

2. Background Information

Java™ is a programming language that, at the source code level, is similar to object oriented programming languages such as C++. Java™ language source code is compiled into an intermediate representation based on a plurality "bytecodes" that define specific tasks. In some implementations, the bytecodes are further compiled to machine language for a particular processor. In order to speed the execution of Java™ language programs, some processors are specifically designed to execute some of the Java™ bytecodes directly.

Many times, a processor that directly executes Java™ bytecodes is paired with a general purpose processor so as to accelerate Java™ program execution in a general or special purpose machine. After loading a set of Java bytecodes, a verification stage is performed before executing the Java bytecodes. Verification may include data flow analysis. Data flow analysis is a process for collecting type information about data in programs without actually executing them. One aspect of verification is type checking to make sure that parameters each bytecode uses that are passed by other bytecodes are of the expected type, e.g. short, long, Boolean, or integer. Type verification in data flow analysis is performed solely in software in the related art, and various algorithms for type verification exist. Specifically, type verification has been done in the Java Virtual Machine in the related art.

A bytecode data-flow analysis algorithm in the related art is composed of two major processes: 1) decoding the bytecodes in order to browse all of the instructions followed by execution of a process associated with each opcode, and 2) building a stack of type and/or local variable map by tracking write operations issued by the execution of each opcode followed by a check that every value read from the stack or local variable map is of the correct type.

Execution of data flow analysis consumes time, thereby penalizing execution time and application start-up time. Thus, a time and power efficient manner of data flow analysis using hardware resources, rather than a pure software approach, is desirable.

SUMMARY

The problems noted above are solved in large part by a method and system to construct a data-flow analyzer for a bytecode verifier using existing hardware resources and software. Specifically, micro-sequences and JSM hardware resources may be employed to carry out data flow analysis in hardware integrated with software. By associating micro-sequences with opcodes, JSM hardware handles decoding bytecodes and micro-sequence code handles checking that parameter types exchanged between bytecodes are correct. Instruction decoding in hardware, hardware stack management, and fast local RAM in accordance with the present disclosure may improve data-flow analysis in terms of time and energy consumption.

Some illustrative embodiments are for a processor comprising a fetch logic that retrieves a first instruction from a memory, a decode logic coupled to the fetch logic, and a data structure at least partially within the memory, wherein the decode logic decodes the first instruction and triggers execution of a first micro-sequence that writes to the data structure a first value indicative of a type of a parameter that the first instruction would write to the data structure if actually executed.

Other illustrative embodiments are a method comprising fetching a first instruction, applying the first instruction to a decode logic of a processor, triggering execution of a first series of instructions by the decode logic that reads a first value from a data structure, the first value indicative of a parameter type written to the data structure by a previously decoded instruction, and verifying that the first value is a parameter type expected by the first instruction.

Yet further illustrative embodiments are a system comprising a first processor, a memory coupled to the first processor, the memory configured to store an instruction, a data structure at least partially within the memory, and a second processor coupled to the first processor and the memory, the second processor comprising a fetch logic that retrieves the instruction from the memory, and a decode logic coupled to the fetch logic, wherein the decode logic decodes the first instruction and triggers execution of a first micro-sequence that writes to the data structure an indication of a type of a parameter that the first instruction would write to the data structure if actually executed.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The terms "asserted" and "not asserted" are used herein to refer to Boolean conditions. An asserted state need not necessarily be a logical 1 or a high voltage state, and thus could equally apply to an asserted being a logical 0 or a low voltage state. Thus, in some embodiments an asserted state may be a logical 1 and a not-asserted state may be a logical 0, with de-assertion changing the state from a logical 1 to a logical 0. Equivalently, an asserted state may be a logic 0 and a not-asserted state may a logical 1 with a de-assertion being a change from a logical 0 to a logical 1.

A bytecode, as used herein, refers to a sort of intermediate code that is more abstract than machine code, and may refer to a binary file containing an executable program formed by a sequence of opcode/data pairs. Each instruction has one byte operation code from 0 to 255 may be followed by parameters such as registers or memory address. The terms "bytecode," "opcode," and instruction are used interchangeably herein.

A local variable map is a structure that, for each local variable, identifies the type of value, if any, stored in the local variables, including but not limiting to long, float, integer, etc.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIG. 4 illustrates operation of the JSM to trigger micro-sequences;

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

Moreover, the various embodiments were developed in the context of processors executing Java™ bytecodes, and thus the description is related to the developmental context; however, the various embodiments find application outside the Java environment, such as Microsoft's ".NET" (pronounced "dot net") framework or in programs written in C and C++, and thus the description in relation to a Java environment should not be construed as a limitation as to the breadth of the disclosure.

The subject matter disclosed herein is directed to a programmable electronic device such as a processor. The processor described herein is particularly suited for executing Java™ bytecodes, or comparable code. Java™ itself is particularly suited for embedded applications as it is a relatively "dense" language, meaning that on average each instruction or bytecode may perform a large number of functions compared to other programming languages. The dense nature of Java™ is of particular benefit for portable, battery-operated devices with small amounts of memory. The reason, however, for executing Java™ code is not material to this disclosure or the claims which follow. Further, the processor advantageously has one or more features that permit the execution of the Java™ code to be accelerated.

Figure 1:
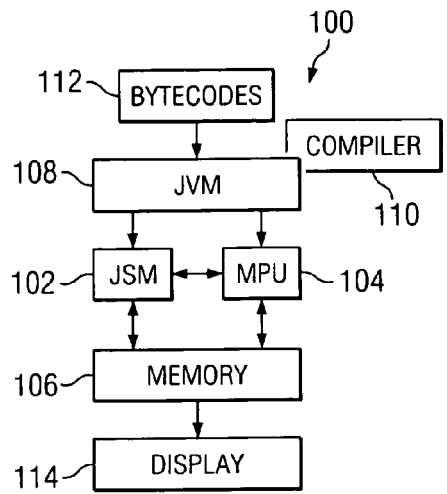
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a combination of software and hardware. The software may comprise the compiler 110 and the hardware may comprise the JSM 102. The JVM may comprise a class loader, bytecode verifier, garbage collector, and a bytecode interpreter loop to interpret the bytecodes that are not executed on the JSM processor 102. Other components (not specifically shown) may be included as desired for various applications.

Java™ language source code is converted or compiled to a series of bytecodes 112, with each individual one of the bytecodes referred to as an "opcode." Bytecodes 112 may be provided to the JVM 108, possibly compiled by compiler 110, and provided to the JSM 102 and/or MPU 104 for execution. In accordance with some embodiments of the invention, the JSM 102 may execute at least some Java™ bytecodes directly. When appropriate, however, the JVM 108 may also request the MPU 104 to execute one or more Java™ bytecodes not executed or executable by the JSM 102. In addition to executing compiled Java™ bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, management of the display 114, and receiving input from input devices (not specifically shown). Java™ code, whether executed on the JSM 102 or MPU 104, may be used to perform any one of a variety of applications such as multimedia, games or web based applications in the system 100, while non-Java™ code, which may comprise the O/S and other native applications, may still run on the system on the MPU 104.

Most Java™ bytecodes perform stack-based operations. For example, an "IADD" (integer add) Java™ opcode pops two parameters (of integer type) off the top of the stack, adds them together, and pushes the sum back on the stack (also of integer type). A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java™ bytecodes, a second instruction set other than Java™ bytecodes. In some embodiments, the second instruction set may comprise register-based and memory-based operations rather than stack-based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions, or stated alternatively, Java™ bytecodes may trigger a micro-sequence that executes another set of instructions to perform the function of the particular opcode. The execution of Java™ code may thus be made more efficient and run faster by replacing some opcodes by more efficient micro-sequences of C-ISA instructions. As such, JSM 102 comprises a stack-based architecture for efficient and accelerated execution of Java™ bytecodes, combined with a register-based architecture for executing register and memory based micro-sequences of C-ISA instructions. Because various data structures described herein are JVM-dependent, and thus may change from one JVM implementation to another, the software flexibility of the micro-sequence provides a mechanism for various JVM optimizations now known or later developed.

Figure 2:
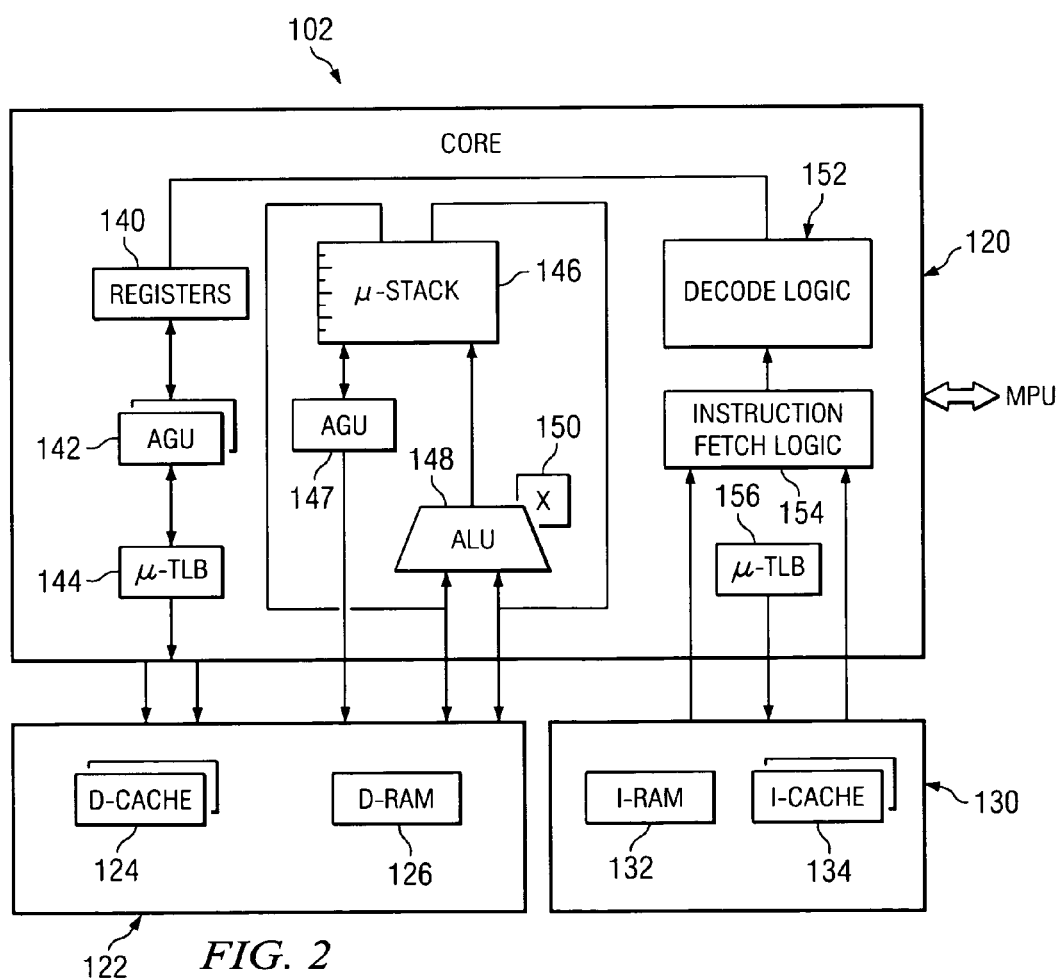
FIG. 2 shows a block diagram of the JSM of FIG. 1 in accordance with embodiments of the invention.

FIG. 2 shows an illustrative block diagram of the JSM 102. As shown, the JSM comprises a core 120 coupled to data storage 122 and instruction storage 130. The components of the core 120 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Bytecodes may be fetched from instruction storage 130 by fetch logic 154 and decoded by decode logic 152. The AGUs 142 may be used to calculate addresses for C-ISA instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running on the MPU 104.

Java™ bytecodes may also pop data from and push data onto the micro-stack 146, which micro-stack 146 preferably comprises a plurality of gates in the core 120 of the JSM 102. The micro-stack 146 preferably comprises the top n entries of a larger stack that is implemented in data storage 122. Although the value of n may be vary in different embodiments, in accordance with at least some embodiments the size n of the micro-stack may be the top eight entries in the larger, memory-based stack. By implementing the micro-stack 146 hardware in the core 120 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches bytecodes from instruction storage 130, which bytecodes may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 122 comprises data cache ("D-cache") 124 and data random access memory ("D-RAM") 126. The stack (excluding the micro-stack 146), arrays and non-critical data may be stored in the D-cache 124, while Java™ local variables, critical data and non-Java™ variables (e.g., C, C++) may be stored in D-RAM 126. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of Java™ bytecode and mixed Java™/C-ISA instructions.

Referring now to FIG. 3, the registers 140 may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for an executing micro-sequence. The use of the PC and micro-PC will be explained in greater detail below. In addition to use as a GP register, register R5 may be used to store the base address of a portion of memory in which Java™ local variables may be stored when used by the current Java™ method. The top of the micro-stack 146 can be referenced by the values in registers R6 and R7, and the top of the micro-stack may have a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-Sequence-Active" bit, referenced as 198) in status register R15 is used to indicate whether the JSM 102 is executing by way of a micro-sequence. This bit controls in particular, which program counter is used R4 (PC) or R12 (micro-PC) to fetch the next instruction.

FIG. 4 illustrates the operation of the JSM 102 with regard to triggering of micro-sequences based on Java™ bytecodes. In particular, FIG. 4 illustrates the instruction storage 130, the decode logic 152, and a micro-sequence vector table 162. The micro-sequence vector table 162 may be implemented in the decode logic 152, or as separate logic in the JSM 102. The micro-sequence vector table 162 preferably comprises a plurality of entries 164, such as one entry for each opcode that the JSM may receive. For example, if there are a total of 256 bytecodes, the micro-sequence vector table 162 preferably comprises at least 256 entries. Each entry 164 may have at least two fields—a field 166 and an associated field 168. Field 168 may comprise a single bit that indicates whether the bytecode 170 is to be directly executed, or whether the associated field 166 contains a reference to a micro-sequence. For example, an asserted bit 168 may indicate the corresponding opcode is directly executable by the JSM, and a non-asserted bit 168 may indicate that the associated field 166 contains a reference to a micro-sequence.

The decode logic 152 accesses the instruction storage 130 and a micro-sequence vector table 162. The decode logic 152 retrieves bytecodes (e.g., bytecode 170) from instruction storage 130 by way of instruction fetch logic 154 (FIG. 2) and decodes the bytecodes to determine the type of bytecode. Upon determining that the bytecode has been micro-sequenced by checking the bit 168, the decode logic 152 references the micro-sequence vector table 162 for the address of the particular micro-sequence in the memory.

The micro-sequence vector table 162 may be pre-programmed, or alternatively, may be amenable to modification at any time. In various embodiments, the JVM 108 may write the plurality of micro-sequences based on the opcodes of the instruction set. The micro-sequences may be pre-programmed, or may be subject to modification by the JVM 108. For instance, a set of micro-sequences might be written to perform bytecode type verification, and once the type has been checked for each opcode, micro-sequences may be re-written by the JVM 108 to perform some other function. Once type verification is complete, bit 168 may accordingly be reset, not-asserted or asserted for execution procedures, such as those described in U.S. application Ser. No. 10/632,216, filed Jul. 31, 2003, titled "Micro-Sequence Execution in a Processor," incorporated by reference in its entirety.

If the bit 168 indicates the associated field 166 includes a reference to a micro-sequence, the reference may comprise the full starting address in instruction storage 130 of the micro-sequence, or a part of the starting address that can be concatenated with a base address that may be programmable in the JSM. In the former case, field 166 may provide as many address bits as are required to access the full memory space. In the latter case, a register within the JSM registers 140, or preferably within a JSM configuration register accessible through an indirect addressing mechanism using the IRI register, is programmed to hold the base address. In these embodiments the vector table 162 may supply only the offset to access the start of the micro-sequence. Most or all JSM internal registers 140 and any other registers may be accessible by the MPU 104, and therefore may be modified by the JVM as necessary. Although not required, the offset addressing technique may be preferred to reduce the number of bits needed within field 166. At least a portion 180 of the instruction storage 130 may be allocated for storage of micro-sequences and thus the starting address may point to a location in micro-sequence storage 180 at which a particular micro-sequence can be found. The portion 180 may be implemented in I-RAM 132 shown in FIG. 2.

In operation, the decode logic 152 uses an opcode as an index into micro-sequence vector table 162. Once the decode logic 152 locates the indexed entry 164, the decode logic 152 examines the associated bit 168 to determine whether the opcode triggers a micro-sequence for bytecode type verification. The details of execution that occurs after completion of bytecode type verification, however, are not material to this disclosure. If the bit 168 indicates that the opcode triggers a micro-sequence, then the decode logic 152 preferably changes the opcode into a "NOP," executes the NOP opcode, asserts the micro-sequence-active bit 198 in the status register R15, and begins fetching the first micro-sequence instruction. Changing the opcode into a NOP while fetching the first instruction of the micro-sequence permits the JSM to process multi-cycle instructions that are further advanced in the pipe without additional latency. The micro-sequence-active bit may be set at any suitable time, such as when the micro-sequence enters the JSM execution stage (not specifically shown).

The JSM 102 implements two program counters—the PC 186 (register R4) and the micro-PC 188 (register R12). In accordance with some embodiments, one of these two program counters is the active program counter used to fetch and decode bytecodes. The PC 186 stored in register R4 may be the active program counter when executing bytecodes. The micro-PC 188 stored in register R12 may be the active program counter when fetching and executing micro-sequences. Setting the status register's micro-sequence-active bit causes the micro-PC 188 (register R12) to become the active program counter instead of the PC 186. Also, the contents of the field 166 associated with the micro-sequenced opcode is loaded into the micro-PC 188. At this point, the JSM 102 begins fetching and decoding the instructions of the micro-sequence. At or about the time the decode logic begins using the micro-PC 188 from register R12, the PC 186 preferably is incremented by a suitable value to point the program counter to the next bytecode following the opcode that triggered the micro-sequence. In at least some embodiments, the micro-sequence-active bit within the status register R15 may only be changed when the first instruction of the micro-sequence enters the execute phase of JSM 102 pipe. The switch from PC 186 to the micro-PC 188 preferably is effective immediately after the micro-sequenced bytecode is decoded, thereby reducing the latency.

The micro-sequence may perform any suitable task, such as parameter type checking, and then end with a predetermined instruction from the C-ISA called "RtuS"(return from micro-sequence) that indicates the end of the sequence. This C-ISA instruction causes a switch from the micro-PC (register R12) to the PC (register R4). Preferably, the PC 186 was previously incremented so that the value of the PC 186 points to the next instruction to be decoded.

In an embodiment in accordance with the present disclosure, a stack-based procedure may be used for type checking. A stack-based procedure, as described below, is merely one embodiment and should not be interpreted, or otherwise used, as limiting the scope of the disclosure, unless otherwise specified. In addition, one skilled in the art will understand that the type checking process described herein has broad application, and the discussion of any embodiments is meant only to be exemplary of those embodiments, and not in tended to intimate that the scope of the disclosure is limited to those embodiments. For example, instead of or in addition to a stack, in various embodiments, any data structure, including a local variable map, may be employed in type checking.

An opcode is micro-sequenced and the micro-sequence, rather than performing the function of the opcode, instead performs parameter type checking. In the case of an illustrative IADD opcode, rather than popping two parameters off the stack, adding them together, and pushing the resultant back on the stack, the micro-sequence reads values off the stack and verifies that the parameter type is what is expected by the IADD instruction—integers. Thereafter, the micro-sequence pushes a value on the stack indicative of the parameter that an illustrative IADD opcode would push—again an integer. By defining a micro-sequence for type checking for each possible bytecode, type checking for all bytecodes may be performed in this manner.

In embodiments in accordance with the present disclosure, a type checking procedure implemented with a local variable map. A micro-sequence associated with an opcode triggers type checking in the local variable map containing the type for each local variable, rather than the value of the local variable. In such embodiments, the micro-sequence associated with each opcode may pull the parameter representing type for each local variable from the local variable map, and check the type.

Figure 5:
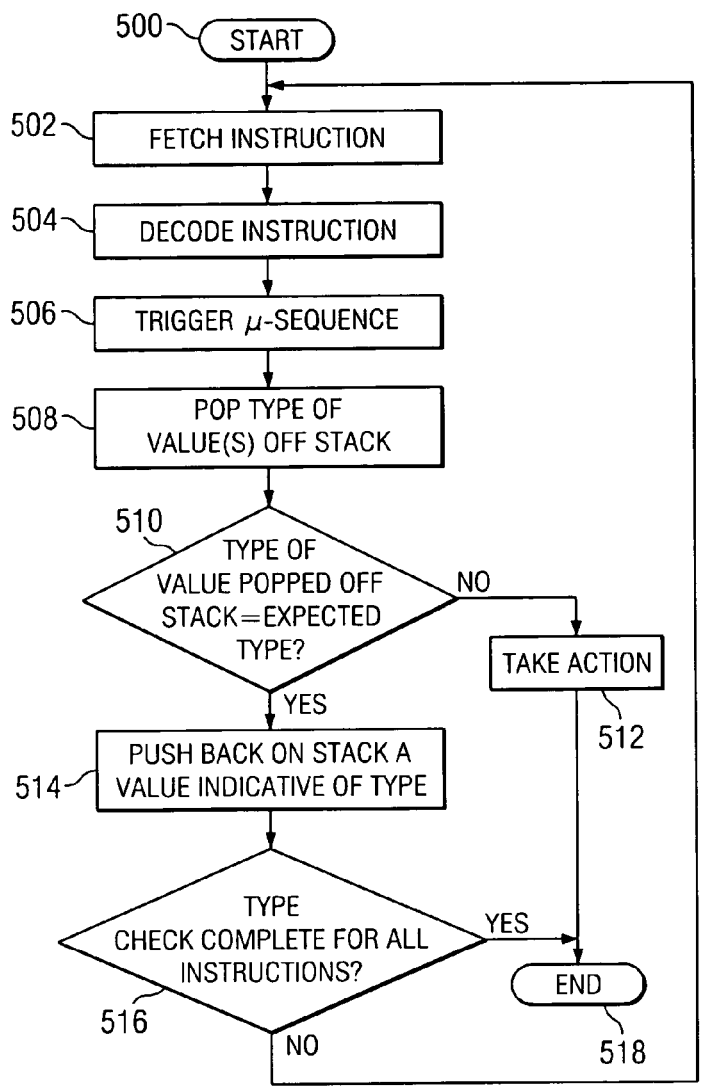
FIG. 5 illustrates a method in accordance with embodiments of the invention.

FIG. 5 illustrates a flow diagram of a method in accordance with stack-based embodiments of the invention. In particular, FIG. 5 illustrates a method for construction of a data-flow analyzer for a bytecode verifier that may be implemented, at least in part, by the decode logic 152. The process may start (block 500) and fetch a bytecode (block 502). Fetching is performed in hardware in accordance with the present disclosure. The decode logic 152 decodes the bytecode (block 504). Decoding is performed in hardware in accordance with the present disclosure. The decode logic determines whether the bit 168 is asserted, reflecting whether the bytecode has an associated micro-sequence. If the bit 168 is asserted, execution of a micro-sequence is triggered (block 506). During bytecode verification, the bit 168 may be asserted for most or all bytecodes. The micro-sequence, in various embodiments of the present invention, proceeds to perform data flow analysis. Triggering execution of a micro-sequence is performed in hardware in accordance with the present disclosure.

Data flow analysis in accordance with embodiments of the invention may involve reading one or more value(s) off of the stack (block 508), wherein the values are indication of a type of a parameter that would pop off the stack if the bytecode was actually executed. This reading of parameters may be achieved by execution of a micro-sequence. Thereafter, the type of the values popped off the stack (or alternatively, read from the local variable map) is checked to see if the type is the same as the type expected if the bytecode were actually executed (block 510). Similarly, the type checking of block 510 may be achieved by execution of a micro-sequence. For example, for an illustrative IADD instruction, the type of the values read from the stack is checked to make sure the type is of integer type. For other bytecodes, other types may be expected, and the value(s) read from the stack are checked to determine whether they match the expected type.

If the type represented by the value read from the stack is not the same as the expected type, then appropriate action is taken due to the type mismatch (block 512). One potential action is that the decode logic may generate an exception. The action taken may be achieved by execution of a micro-sequence.

Further, to the extent a particular opcode also writes one or more values on the stack or to the local variable map, in accordance with embodiments of the present invention the micro-sequence for that particular opcode writes a value onto the stack (and/or local variable map) indicative of the parameter type (block 514). The value provides an indication of a type of a parameter that the bytecode would push onto the stack if it were actually executed. In the example of the IADD opcode, the value pushed back to the stack would be representative of the integer type. Writing a value to the stack that is indicative of parameter type is achieved using a micro-sequence.

The various blocks are repeated until type checking is complete for all bytecodes. Thus, a check may be done to determine whether type checking is complete for all bytecodes (block 516), and if type checking is complete, the method ends (block 518). If type checking is not complete for all bytecodes, the method passes to fetch another opcode (block 502). The typechecking block is an optional block, and may be performed by a micro-sequence. Block 516 occurs for a uSequence associated to an unconditional branch (such as, for example, GOTO, RETURN), as such instructions may necessitate a check for whether the associated instruction is the last instruction. In a well formed code, a no-branch opcode or a conditional branch opcode has necessary a valid opcode after it, so the check of block 516 is not needed.

Several of the blocks described herein are optional. After any of the above blocks are achieved via a micro-sequence (such as blocks 508, 510, 514, 516), the process alternatively could proceed to the end (block 518), or repeat to fetching in hardware (block 502), or end in a type error (block 512).

The micro-sequence triggered (block 506) depends on the particular opcode considered, and therefore, which particular opcode is considered determines whether values are written to or read from the stack, as well as how many values are written or read. An opcode may trigger a micro-sequence that only writes one or more values, a micro-sequence that only reads one or more values, or a micro-sequence that both reads and writes values to or from the stack or local variable map.

When bytecode verification is complete, the bytecodes may be executed safely. Discussion of actual execution of these bytecodes is not material to this disclosure, except to note that when bytecode verification is completed, the JVM may re-write the micro-sequences as necessary to carry out tasks other than bytecode verification, and set or reset the bit 168 accordingly. Execution of the instructions may follow, as type verification has ensured the safety of execution to some degree.

Figure 6:
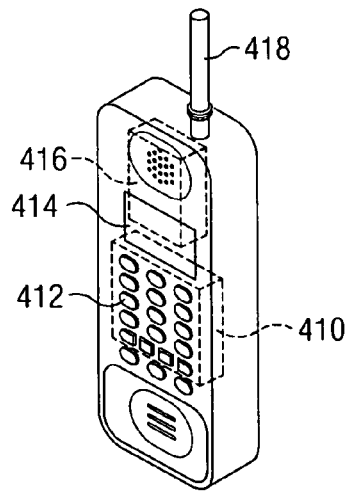
FIG. 6 depicts an illustrative embodiment of the system described herein.

System 100 may be implemented as a mobile cell phone such as that shown in FIG. 6. As shown, the mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Each and every claim is incorporated into the specification as an embodiment of the present invention.

What is claimed is:

1. A processor, comprising:
   a fetch logic configured to retrieve a plurality of instructions from a memory, wherein the plurality of instructions are from a first native instruction set of the processor; and
   a decode logic coupled to the fetch logic, wherein the decode logic is configured to decode the plurality of instructions;
   wherein the processor is configurable to execute the plurality of instructions and to verify that types of values exchanged between the plurality of instructions are correct,
   wherein when the processor is configured to verify types of values, each instruction in the first native instruction set is associated with a micro-sequence configured to perform type verification corresponding to the instruction and the decode logic, responsive to decoding each instruction in the plurality of instructions, causes the micro-sequence associated with each instruction in the plurality of instructions to be executed, wherein the types of the values exchanged between the plurality of instructions are verified, and
   when the processor is configured to execute the plurality of instructions, each instruction in a subset of the first native instruction set is associated with a micro-sequence configured to perform a function of the instruction and the decode logic causes each instruction in the plurality of instructions to be executed, wherein when the micro-sequence is associated with the instruction, the micro-sequence is executed to perform the function of the instruction,
   wherein a micro-sequence is one or more instructions from a second native instruction set of the processor.

2. The processor of claim 1,
   wherein type verification corresponding to the instruction comprises:
   reading a type indicator from a data structure; and
   determining whether the type indicator is indicative of a type of a value that the instruction expects to read from the data structure when the instruction is executed.

3. The processor of claim 2, wherein an exception is generated when the type indicator read from the data structure is not indicative of an expected type.

4. The processor of claim 2, wherein the data structure is one selected from a group consisting of a stack and a local variable set.

5. The processor of claim 1, further comprising:

a vector table accessible by the decode logic, wherein the vector table comprises an entry for each instruction in the first native instruction set, wherein when the processor is configured to verify types of values, the vector table is used to associate each instruction in the first native instruction set with the micro-sequence configured to perform type verification corresponding to the instruction, and when the processor is configured to execute the plurality of instructions, the vector table is used to associate each instruction of the subset of instructions with the micro-sequence configured to perform the function of the instruction.

6. The processor of claim 5, wherein when a micro-sequence is associated with an instruction, the entry references a location in memory in which the micro-sequence is stored.

7. The processor of claim 1, wherein type verification corresponding to the instruction comprises writing a type indicator to a data structure, wherein the type indicator is indicative of a type of a value that the instruction would write to the data structure when the instruction is executed.

8. The processor of claim 7, wherein the data structure is one selected from a group consisting of a stack and a local variable set.

9. A method for verifying that types of values exchanged between a plurality of instructions from a first native instruction set of a processor are correct, comprising:

configuring the processor to verify types of values instead of executing instructions in the first native instruction set, wherein configuring comprises associating each instruction in the first native instruction set with a micro-sequence configured to perform type verification corresponding to the instruction;

responsive to fetching and decoding each instruction in the plurality of instructions, executing the micro-sequence associated with the instruction, wherein the types of the values exchanged between the plurality of instructions are verified; and reconfiguring the processor to execute instructions in the first native instruction set after the types of the values are verified, wherein reconfiguring comprises associating each instruction in a subset of the first native instruction set with a micro-sequence configured to perform a function of the instruction, wherein all other instructions in the first native instruction set are executed directly by the processor, wherein a micro-sequence is one or more instructions from a second native instruction set of the processor.

10. The method of claim 9, wherein associating each instruction in the first native instruction set comprises placing a reference to the micro-sequence in an entry of a vector table, wherein the vector table comprises an entry for each instruction in the first native instruction set, and fetching and decoding comprises accessing the vector table to locate the micro-sequence.

11. The method of claim 9, wherein type verification corresponding to the instruction comprises:

writing a type indicator to a data structure, wherein the type indicator is indicative of a type of a value that the instruction would write to the data structure when the instruction is executed.

12. The method of claim 9, wherein type verification corresponding to the instruction comprises:

reading a type indicator from a data structure; and determining whether the type indicator is indicative of a type of a value that the instruction expects to read from the data structure when the instruction is executed.

13. The method of claim 12, further comprising generating an exception when the type indicator read from the data structure is not indicative of an expected type.

14. The method of claim 9, wherein type verification corresponding to the instruction comprises writing a type indicator to a data structure, wherein the type indicator is indicative of a type of a value that the instruction would write to the data structure when the instruction is executed.

15. A system, comprising:

a first processor; and a second processor coupled to the first processor, the second processor comprising:

a fetch logic configured to retrieve a plurality of instructions from a memory, wherein the plurality of instructions are from a first native instruction set of the second processor; and a decode logic coupled to the fetch logic, wherein the decode logic is configured to decode the plurality of instructions;

wherein the second processor is configurable to execute the plurality of instructions and to verify that types of values exchanged between the plurality of instructions are correct, wherein when the second processor is configured to verify types of values, each instruction in the first native instruction set is associated with a micro-sequence configured to perform type verification corresponding to the instruction and the decode logic, responsive to decoding each instruction in the plurality of instructions, causes the micro-sequence associated with each instruction in the plurality of instructions to be executed, wherein the types of the values exchanged between the plurality of instructions are verified, and when the second processor is configured to execute the plurality of instructions, each instruction in a subset of the first native instruction set is associated with a micro-sequence configured to perform a function of the instruction and the decode logic causes each instruction in the plurality of instructions to be executed, wherein when the micro-sequence is associated with the instruction, the micro-sequence is executed to perform the function of the instruction, wherein a micro-sequence is one or more instructions from a second native instruction set of the second processor.

16. The system of claim 15, wherein type verification corresponding to the instruction comprises:

reading from a data structure a type indicator; and determining whether the type indicator is indicative of a type of a value that the instruction would read from the data structure when executed.

17. The system of claim 16, wherein an exception is generated when the type indicator read from the data structure is not indicative of an expected type.

18. The system of claim 16, wherein the data structure is one selected from a group consisting of a stack and a local variable set.

19. The system of claim 15, wherein the second processor further comprises:
a vector table accessible by the decode logic, wherein the vector table comprises an entry for each instruction in the first native instruction set,
wherein when the second processor is configured to verify types of values, the vector table is used to associate each instruction in the first native instruction set with the micro-sequence configured to perform type verification corresponding to the instruction, and
wherein when the second processor is configured to execute the plurality of instructions, the vector table is used to associate each instruction of the subset of instructions with the micro-sequence configured to perform the function of the instruction.

20. The system of claim 19, wherein when a micro-sequence is associated with an instruction, the entry references a location in the memory in which the micro-sequence is stored.

21. The system of claim 15, wherein type verification corresponding to the instruction comprises writing a type indicator to a data structure, wherein the type indicator is indicative of a type of a value that the instruction would write to the data structure when the instruction is executed.

22. The system of claim 21, wherein the data structure is one selected from a group consisting of a stack and a local variable set.

* * * * *